UNITED STATES PATENT OFFICE.

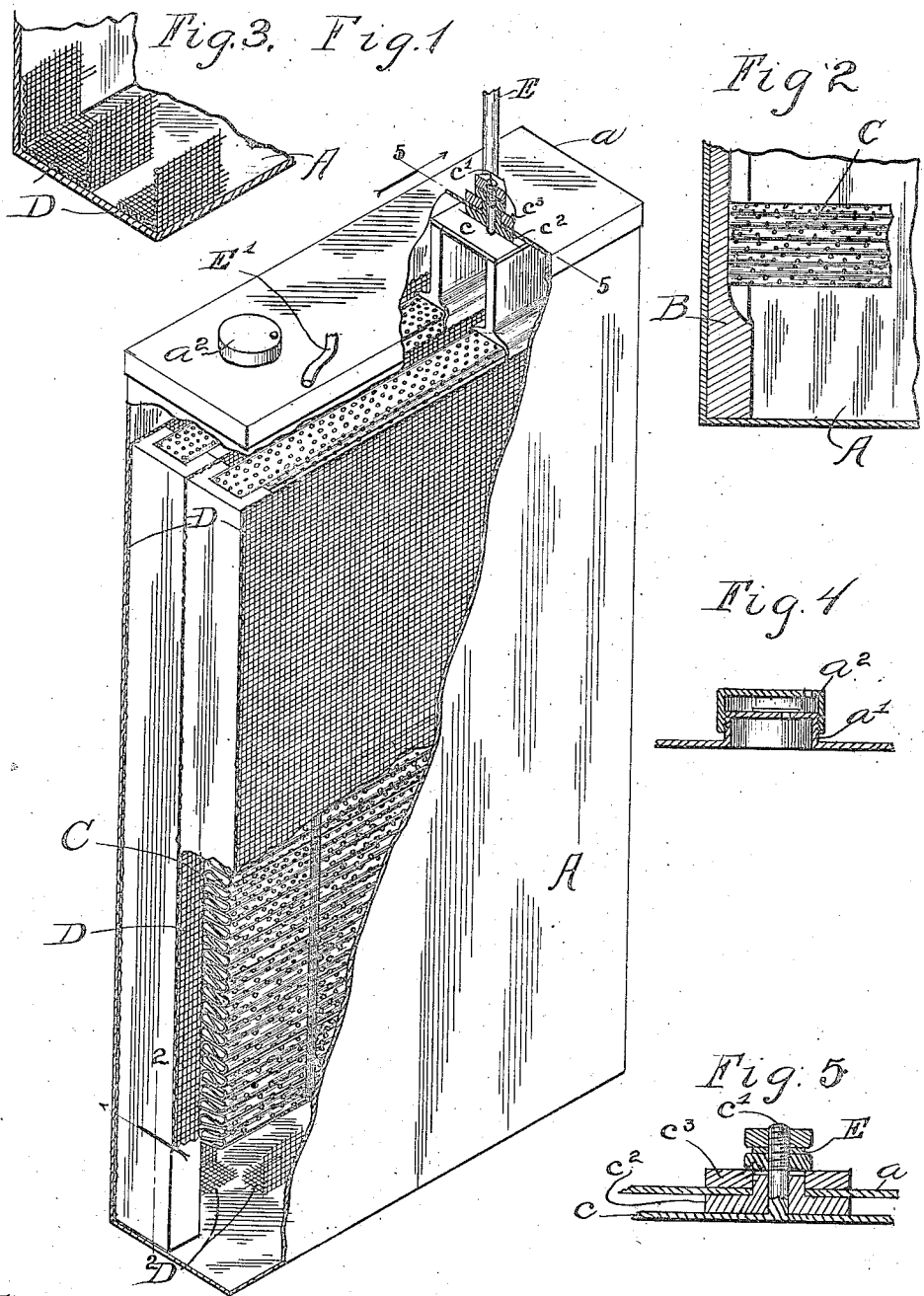

WILLIAM GARDINER, OF CHICAGO, ILLINOIS, ASSIGNOR, BY MESNE ASSIGNMENTS, TO UNIVERSAL ELECTRIC STORAGE BATTERY COMPANY, A CORPORATION OF DELAWARE.

SECONDARY BATTERY.

No. 827,968.      Specification of Letters Patent.      Patented Aug. 7, 1906.

Application filed August 31, 1904. Serial No. 222,790.

*To all whom it may concern:*

Be it known that I, WILLIAM GARDINER, a citizen of the United States, and a resident of the city of Chicago, in the county of Cook and State of Illinois, have invented certain new and useful Improvements in Secondary Batteries; and I do hereby declare that the following is a full, clear, and exact description thereof, reference being had to the accompanying drawings, and to the letters of reference marked thereon, which form a part of this specification.

This invention relates to improvements in storage batteries or accumulators.

The object of the invention is to provide an accumulator so constructed as to dispense with the use of a negative-pole element as such and also to prevent active material contained in the positive-pole element from peeling or disintegration therefrom.

It is also an object of the invention to provide improved separators and elements so arranged and combined as to provide maximum efficiency without possibility of loss of current through short-circuiting.

The invention embraces many novel features; and it consists in the matters hereinafter described, and more fully pointed out and defined in the appended claims.

In the drawings, Figure 1 is a perspective view, broken away, of a cell embodying my invention. Fig. 2 is a fragmentary section taken on line 2 2 of Fig. 1. Fig. 3 is a fragmentary view in the bottom of the cell. Fig. 4 is a vertical section taken through the filling-aperture therefor. Fig. 5 is a fragmentary section taken on line 5 5 of Fig. 1.

As shown in said drawings, A indicates a cell or receptacle, of metal or other good conductor, and provided with a close-fitting cover $a$, adapted to be permanently brazed thereon after the elements are secured therein, the brazing thereof acting to tightly seal the cell. One or more pairs of vertical separators B, of hard rubber or other suitable material, disposed in opposite sides of the cell, are each provided with a vertical groove in the inwardly-directed or front face of each, as shown in Figs. 1 and 2. Within the groove of each pair of separators is provided the plate C, which, as shown, is constructed in accordance with my invention "Grid or Element for Secondary Batteries," (for which application for United States Patent was filed on the 22d day of August, 1904, Serial No. 221,644,) and which consists of a sheet of approximately pure lead closely perforated and folded transversely to provide a plurality of closely-arranged folds which are jammed close together, forming horizontal pockets adapted to contain active material. Said plates are preferably electrochemically formed before insertion into the cell. The folds of the plate are burned together, and the outer surface of the plate is scraped to remove the active material after the forming, leaving the interior filled with the active material. On each side of and inclosing the separators B is provided the wire-net D, preferably of a good conducting material not chemically acted upon by the acid constituents of the electrolyte and which, as shown, occupies the position of the negative-pole element in the cell and extends downwardly on both sides of the separators and beneath and between the same, the bottom of each sheet being bent at a right angle with the plane thereof and resting upon the metallic bottom of the cell and affording positive contact therewith. Preferably the cell and wire-net are of copper, which is plated with silver. This causes the same to be unaffected by the acid in the electrolyte.

The electrolyte used is preferably a solution of sulfuric acid and water containing sulfate of zinc, sulfate of lithium, and bisulfate of mercury. In charging, the metal constituents of the salts are deposited on the wire-net and constitute the negative-pole element, said wire screen serving but as a support for the deposit.

The conductors $C'$ of the positive-pole elements, as shown in Fig. 1, are connected at the top by a conducting-plate $c$, which is insulated from the cover $a$ of the cell. A conductor $c'$ leads upwardly therefrom through an aperture in said cover, and a washer, of rubber, $c^2$, sleeved to receive the conductor $c'$ and to insulate the same from the cover, is provided thereon. An insulating-washer $c^3$ is provided thereon above the cover. Said washers provide an insulating-packing at the point where said conductor passes through the cover. A filling-aperture is provided in the top of the receptacle having a raised threaded flange $a'$ about the same in a familiar manner adapted to receive the screw-cap $a^2$, and a valve $a^3$ is provided in said cap acting to permit the escape of gases from the cap during charging.

Inasmuch as the receptacle or cell is metallic and in positive contact with the wire-gauze upon which the negative-pole electrode deposit is formed, the negative conductor E' may be connected directly with the receptacle, as shown in Fig. 1, and any number of such cells may be employed in battery, it being only necessary to provide insulating-separators between said cells.

The operation is as follows: In charging the cell the metallic constituents of the electrolyte are deposited on the wire-net, thus forming a negative-pole element having great surface and but little weight. In the discharge the deposit is taken off the wire-net and restored to the solution. It would seem that the mercury in charging is restored to its metallic state and acts to prevent local action during the discharge. The use of lithium sulfate in the electrolyte aids greatly in retaining the charge. Inasmuch as the cell is tightly closed, the cells may be turned in any position without interference with its discharge or spilling the contents. Agitation or shaking of the cell during the discharge is even advantageous. The separator-strips afford a positive support for the positive-pole elements and serve to hold the wire-net out of contact therewith and pressed upon the side walls and bottom of the cell. The conductor affords connection for the conductor-wire E in the usual or any convenient manner.

Obviously many details of construction may be modified without departing from the principles of my invention.

I claim as my invention—

1. In an accumulator the combination with a metallic cell, of a plurality of separator-strips arranged on opposite sides thereof and each grooved centrally on its inner face to a point near its lower end, plates engaged in opposite separators out of contact with the cell and sheets of reticulated material engaged between said separators out of engagement with said plates and in engagement with the bottom and sides of the cell.

2. An accumulator-cell comprising a metallic receptacle, a plurality of non-connected vertical strips of insulating material arranged on opposite sides of said receptacle and provided with grooves in the inner faces thereof, plates engaged in said grooves, an independent sheet of wire-gauze inserted between adjacent plates and between the plates and the walls of the receptacle and having metallic contact with said receptacle and an electrolyte adapted to form a metallic deposit on said gauze in charging.

In testimony whereof I have hereunto subscribed my name in the presence of two subscribing witnesses.

WILLIAM GARDINER.

Witnesses:
W. W. WITHENBURY,
RAY WITHENBURY.